(12) United States Patent
Kim et al.

(10) Patent No.: US 11,767,241 B2
(45) Date of Patent: Sep. 26, 2023

(54) DEVICE FOR PURIFYING FLUID USING ION CONCENTRATION POLARIZATION PHENOMENON AND PURIFICATION SYSTEM

(71) Applicants: SEOUL NATIONAL UNIVERSITY R&DB FOUNDATION, Seoul (KR); INDUSTRY ACADEMIC COOPERATION FOUNDATION, HALLYM UNIVERSITY, Gangwon-do (KR)

(72) Inventors: Sung Jae Kim, Seoul (KR); Won Seok Kim, Seoul (KR); Ki Hong Kim, Seoul (KR); Gun Yong Sung, Seoul (KR)

(73) Assignees: SEOUL NATIONAL UNIVERSITY R&DB FOUNDATION, Seoul (KR); INDUSTRY ACADEMIC COOPERATION FOUNDATION, HALLYM UNIVERSITY, Gangwon-do (KR)

( * ) Notice: Subject to any disclaimer, the term of this patent is extended or adjusted under 35 U.S.C. 154(b) by 936 days.

(21) Appl. No.: 16/603,275

(22) PCT Filed: Apr. 4, 2018

(86) PCT No.: PCT/KR2018/003973
§ 371 (c)(1),
(2) Date: Oct. 7, 2019

(87) PCT Pub. No.: WO2018/186679
PCT Pub. Date: Oct. 11, 2018

(65) Prior Publication Data
US 2021/0101806 A1 Apr. 8, 2021

(30) Foreign Application Priority Data
Apr. 7, 2017 (KR) .......................... 10-2017-0045301

(51) Int. Cl.
*B01D 61/46* (2006.01)
*C02F 1/469* (2023.01)
(Continued)

(52) U.S. Cl.
CPC ............ *C02F 1/4693* (2013.01); *B01D 61/46* (2013.01); *B01D 61/52* (2013.01); *B01D 63/08* (2013.01);
(Continued)

(58) Field of Classification Search
None
See application file for complete search history.

(56) References Cited

U.S. PATENT DOCUMENTS

2014/0183046 A1* 7/2014 Crooks ................ C02F 1/4604
204/554
2017/0066665 A1 3/2017 Choi

FOREIGN PATENT DOCUMENTS

| KR | 20110033866 A | 3/2011 |
| KR | 20130062130 A | 6/2013 |
| KR | 20160031155 A | 3/2016 |

OTHER PUBLICATIONS

Kim, et al. "A portable and high energy efficient desalination/purification system by ion concentration polarization" Nanosystems in Engineering and Medicine, edited by Sang H. Choi, Jin-Ho Choy, Uhn Lee, Vijay K. Varadan, Proc. of SPIE vol. 8548, 8548.

* cited by examiner

*Primary Examiner* — Magali P Slawski
*Assistant Examiner* — Brad Gordon
(74) *Attorney, Agent, or Firm* — Stuart H. Mayer (57) ABSTRACT

A purification device is provided. The purification device includes: an injection channel having an inlet provided on one end thereof; a purification channel and a discharge channel which branch off from the other end of the injection
(Continued)

channel via a mesh part, and the remaining substance to be purified is discharged through the discharge channel; an ion-selective membrane contacting at least one side of the mesh part; and a buffer part arranged on the other side of the ion-selective membrane which is in contact with the mesh part, wherein the mesh part has an ion-selective coating layer formed on the surface thereof, and when an electric field is applied, an ion concentration polarization phenomenon occurs to the other end of the injection channel and to the adjacent portion of the mesh part, whereby an ion depletion zone is formed.

8 Claims, 9 Drawing Sheets

(51) Int. Cl.
    *B01D 61/52*     (2006.01)
    *B01D 63/08*     (2006.01)
    *B01D 71/36*     (2006.01)

(52) U.S. Cl.
    CPC ...... *B01D 71/36* (2013.01); *B01D 2311/2603* (2013.01); *B01D 2317/04* (2013.01)

DEVICE FOR PURIFYING FLUID USING ION CONCENTRATION POLARIZATION PHENOMENON AND PURIFICATION SYSTEM

TECHNICAL FIELD

The present invention relates to a device for purifying a fluid using an ion concentration polarization phenomenon and a purification system. More specifically, the present invention relates to a device for purifying a fluid using an ion concentration polarization phenomenon by introducing a mesh portion on which an ion selective coating layer is formed to enhance water treatment capacity per unit time, and a purification system.

BACKGROUND ART

Typical examples of technology used in purification may include filtration and reverse osmosis.

Filtration may be divided, according to the size of material to be exchanged, into micro-filtration with sizes of 0.1-1 ultra-filtration with sizes of 0.01-0.1 and nano-filtration with sizes of 1-10 and the size and type of the membrane used are different for each filtration process.

Reverse-osmosis is an ion exchange technology which is not based on physical characteristics of membranes but on ion diffusion characteristics, and may exchange most monovalent ions.

DISCLOSURE OF THE INVENTION

Technical Problem

Filtration and reverse-osmosis methods are both mainly used not in micro-systems, but in macro-systems, and have a problem in that separation and concentration adjustment of specific monovalent ions are difficult. In addition, since there are a great variety of types of permeable membranes used, there is a problem of low versatility and high prices, and due to large sizes of devices, it is not easy to use the devices as portable devices.

Meanwhile, a phenomenon is being reported in which a material is concentrated by using an ion concentration polarization (ICP) phenomenon. However, when using the ion concentration polarization phenomenon, water treatment capacity is very small, such as several ten nL to several μL per minute, and thus, there is a problem in that micro nano fluid devices may not be used in industrial field requiring a large amount of water treatment due to structural limits thereof.

The present invention solves various problems including the abovementioned problem, and the purpose of the present invention is to provide a purification device and a purification system which have water treatment capacity of at least several mL per minute.

In addition, the purpose of the present invention is to provide a purification device and a purification system which have high power efficiency and may have small sizes to be portable.

However, the above purposes are merely illustrative, and the scope of the present invention is not limited thereto.

Technical Solution

In accordance with an exemplary embodiment, a purification device is provided, which is configured to purify a fluid using an ion concentration polarization phenomenon, the purification device including: an injection channel provided with, at one end thereof, an inlet for injecting a substance to be purified thereinto; a purification channel and a discharge channel which branch from the other end of the injection channel with a mesh part interposed therebetween such that a purified substance is discharged from the purification channel and a remaining substance to be purified is discharged from the discharge channel; an ion-selective membrane coming into contact with at least one side of the mesh part; and a buffer part disposed on the other side of the ion-selective membrane in contact with the mesh part, wherein the mesh part has an ion-selective coating layer formed on a surface thereof, and when an electric field is applied, an ion concentration polarization (ICP) phenomenon occurs to the other end of the injection channel and to the adjacent portion of the mesh part, thereby forming an ion depletion zone.

In accordance with an exemplary embodiment, a purification device is provided, which is configured to purify a fluid using an ion concentration polarization phenomenon, the purification device including: an injection channel provided with, at one end thereof, an inlet for injecting a substance to be purified thereinto; a purification channel and a discharge channel which branch from the other end of the injection channel with a mesh part interposed therebetween such that a purified substance is discharged from the purification channel and a remaining substance to be purified is discharged from the discharge channel; an ion-selective membrane coming into contact with at least one side of the mesh part; and a buffer part disposed on the other side of the ion-selective membrane in contact with the mesh part, wherein the mesh part has an ion-selective coating layer formed on a surface thereof, and when an electric field is applied, an ion concentration polarization (ICP) phenomenon occurs to the other end of the injection channel and to the adjacent portion of the mesh part, thereby forming an ion depletion zone.

In accordance with an exemplary embodiment, a purification device is provided, which is configured to purify a fluid using an ion concentration polarization phenomenon, the purification device including: an injection channel provided with, at one end thereof, an inlet for injecting a substance to be purified thereinto; and a purification channel and a discharge channel which branch from the other end of the injection channel with a mesh part interposed therebetween such that a purified substance is discharged from the purification channel and a remaining substance to be purified is discharged from the discharge channel, wherein the mesh part has an ion-selective coating layer formed on a surface thereof, and when an electric field is applied, an ion concentration polarization (ICP) phenomenon occurs to the other end of the injection channel and to the adjacent portion of the mesh part, whereby an ion depletion zone is formed.

In accordance with an exemplary embodiment, the mesh part may have a shape having a plurality of lattices formed to be perpendicular to a first direction, a second direction perpendicular to the first direction, and a surface formed by the first direction and the second direction.

In accordance with an exemplary embodiment, the purified substance of the mesh part may pass through through-holes of lattices formed in the first direction and the second direction and flow to the purification channel, and the substance to be purified not having passed the through-holes of the lattices may flow to the discharge channel.

In accordance with an exemplary embodiment, a lattice size in the third direction may be smaller than lattice sizes in the first direction and the second direction.

In accordance with an exemplary embodiment, a thickness of the ion-selective coating layer formed on a surface of the mesh part may be equal to or larger than the lattice size in the third direction.

In accordance with an exemplary embodiment, ions of the substance to be purified may move along the ion-selective coating layer of the mesh part and an ion concentration polarization phenomenon may occur.

In accordance with an exemplary embodiment, the plurality of mesh parts may be disposed so as to face each other.

In accordance with an exemplary embodiment, the ion-selective membrane and the ion-selective coating layer may be made of Nafion material.

In accordance with an exemplary embodiment, a purification system is provided which comprises a plurality of purification devices of claim 1 or 2, wherein the purification devices adjacent to each other share the buffer part.

In accordance with an exemplary embodiment, a purification system is provided, which includes a plurality of purification devices of claim 1 or 2, wherein the purification devices are disposed in parallel, one end of each of the injection channels is integrated into a single channel and receives the substance to be purified, and one end of each of the purification channels is integrated into a single channel and the purified substance is discharged.

Advantageous Effects

According to an embodiment of the present invention configured as described above, there is an effect of achieving water treatment capacity of at least several mL per minute and further improving the water treatment capacity through serial or parallel arrangement between purification devices.

In addition, according to one embodiment of the present invention, there is an effect in that high power efficiency is achieved and small sizes can be achieved.

In addition, according to an embodiment of the present invention, a portable purification device of the present invention is used for purification of waste peritoneal dialysate in place of existing large dialysis equipment, thereby having an effect of mitigating the areas of activity of kidney disease patients.

Of course, the scope of the present invention is not limited to such effects.

DESCRIPTION OF REFERENCE NUMERALS

100, 100', 100": Purification device
120: Injection channel
140: Purification channel
150: Mesh part
155: Ion-selective coating layer
160: Discharge channel
170: Separating part
180: Ion-selective membrane
200: Buffer part
210: Buffer part outlet
B: Substance to be purified
B: Remaining substance which was not purified, Concentrated substance
F: Purified substance
P: Ion depletion zone

MODE FOR CARRYING OUT THE INVENTION

The detailed description of the invention to be provided later refers to the accompanying drawings which exemplarily illustrates a specific embodiment in which the invention may be carried out. These embodiments will be described in sufficient detail to enable those skilled in the art to practice the invention. It is to be understood that various embodiments of the present invention are different from each other but need not to be mutually exclusive. For example, a specific shape, structure and characteristics disclosed herein may be implemented in other embodiments without departing from the spirit and scope of the present invention in relation to one embodiment. In addition, it is to be understood that the position or arrangement of individual components in each disclosed embodiment may be modified without departing from the spirit and scope of the invention. Accordingly, the following detailed description is not intended to be taken in a limiting sense, and the scope of the present invention is to be limited only by the appended claims, along with all ranges equivalent to those claimed in the claims, if properly described. In the drawings, like reference numerals refer to the same or similar features throughout the several views, and lengths, areas, thickness and the shapes thereof may also be exaggerated for convenience.

Hereinafter, preferable embodiments of the present invention will be described in detail with reference to the accompanying drawings so as to enable a person skilled in the art to easily implement the present invention.

In the present invention, a substance (sample or specimen) to be purified may mean a brine. In addition, a substance to be purified may mean a substance containing particles having sizes of micrometer to nanometer levels. Blood, microalgae, other fluids, and the like may correspond to the substance, and particles contained in the substance may correspond to red blood cells, microalgae cells, and the like, but the embodiment is not limited thereto. However, hereinafter, embodiments in which a brine is purified to obtain fresh water will mainly be presumed and described.

In addition, in the present invention, a channel may be considered as a passage through which a substance to be purified (sample or specimen) passes. In order to provide such a passage, a channel may be configured in a form of a pipe, a tube or the like. In addition, channels such as injection channels, purification channels, discharge channels or the like may be macro-channels having diametric scales of at least mm or cm so as to have water treatment capacity of at least several mL per minute. The macro-channel may be understood as a channel having a greater unit than the micro-channel having a μm diametric scale described in FIG. 1 below.

Figure 1:
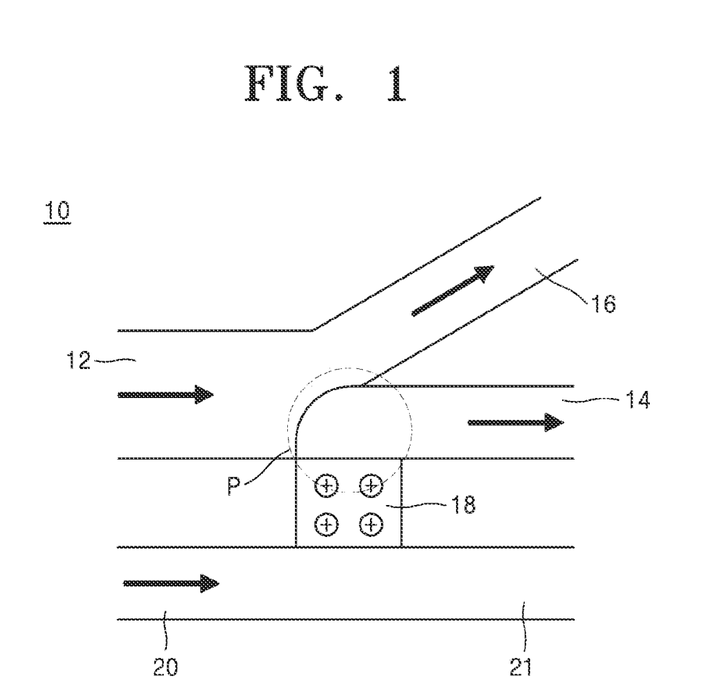
FIG. 1 is a schematic view illustrating a micro-channel device using an ion concentration polarization phenomenon.

FIG. 1 is a schematic view illustrating a micro-channel device using an ion concentration polarization phenomenon.

Referring to FIG. 1, a micro-channel device 10 may be provided with an ion-selective membrane 18. The micro-channel device 10 may include an ion-selective membrane 18 therein so as to induce an ion concentration polarization (ICP) phenomenon.

The ion concentration polarization phenomenon is one of electrochemical transfer phenomena observed around a structure having a nano-membrane. It is theoretically known that when the thickness of an electrical double layer is similar to the size of nano-membrane, single ion permeability is exhibited by overlapping of the electrical double layer inside the nano-membrane. Ions having electric charges such as wall electric charges cannot pass through a nano-membrane due to diffusion and drift, but while only ions having electric charges opposite to wall electric charges pass through the nano-membrane, an ion depletion zone appears in the positive electrode direction boundary surface of the nano-membrane and an ion enrichment zone appears in the negative electrode direction boundary surface. Strong electrical repulsion between ions that could not pass through the nano-membrane affects both positive ions and negative ions, and thus, an ion concentration gradient phenomenon occurs. At this point, vortexes are formed around the ion depletion zone P, and particles, cells, liquid drops, and the like are affected by electrical repulsion of the ions at the boundary surface of the ion depletion zone P and pushed out of the vicinity of the nano-membrane.

The micro-channel may include a first inlet 12 into which a substance to be purified is injected and a first outlet 14 and a second outlet 16 through which a purified substance and a non-purified substance are discharged. The first outlet 14 and the second outlet 16 may branch from a portion at which at least a portion of a plurality of flow passages and a portion of ion-selective membranes 18 come into contact with each other.

Here, the first inlet 12 may be understood as an anodic-side injection port and a second inlet 20 may be understood as a cathodic-side injection port, and the first outlet 14 may be understood as an anodic-side upper outlet, the second outlet 16 may be understood as an anodic-side lower outlet, and a third outlet 21 may be understood as an anodic-side outlet.

In addition, an electric field is applied to the micro-channel device 10 and an ion concentration polarization phenomenon thereby occurs at the vicinity of the ion-selective membrane 18, and thus, particles are separated from a solution and discharged, and concentration and desalinization may be performed. When a potential difference is generated at the anodic side and the cathodic side together with a constant flow speed, an ion depletion zone P is generated due to occurrence of an ion concentration polarization phenomenon. At this point, specific molecules contained in the substance to be purified cannot pass through the ion depletion zone P and move only to the second outlet 16 and are concentrated while pushed outward from the boundary of the ion depletion zone P. Most of salts can be discharged through the third outlet 21 and purified water may be collected to the first outlet 14.

However, the micro-channel device 10 using an ion concentration phenomenon has very small water treatment capacity of several ten nL to several μL because a substance to be purified moves through a channel having a diameter of μm scale. Accordingly, there is a problem of not being used in industrial fields requiring large-capacity water treatment.

Figures 2, 2A:
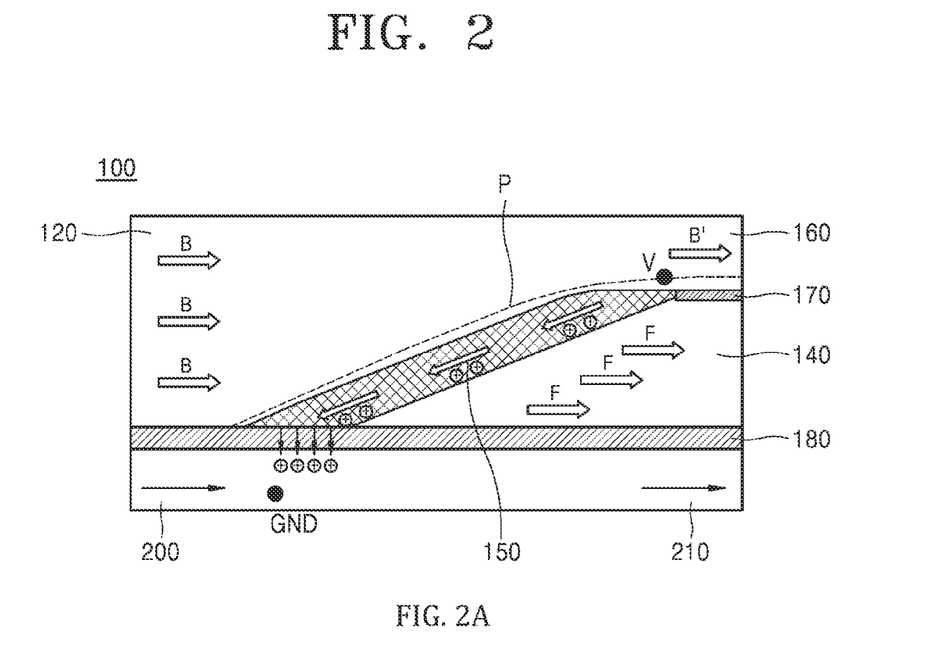
FIG. 2 is a schematic view illustrating a purification device according to a first embodiment of the present invention.
Figure 2B:
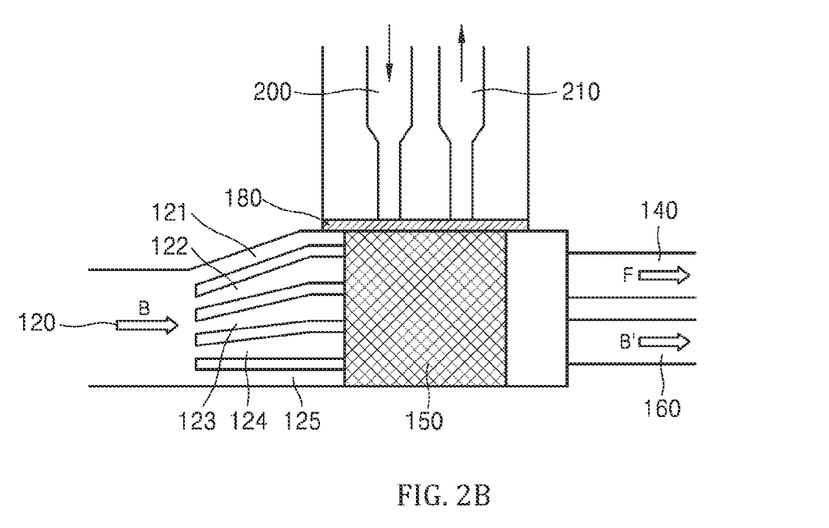
Figures 4, 4A:
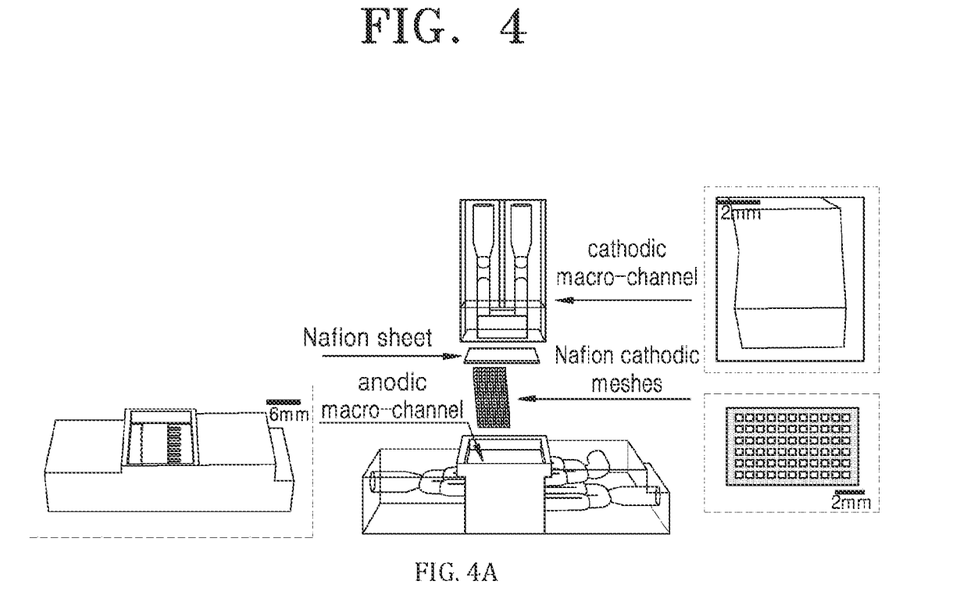
FIGS. 4 and 5 are photographs of a purification device according to an embodiment of the present invention.
Figure 4B:
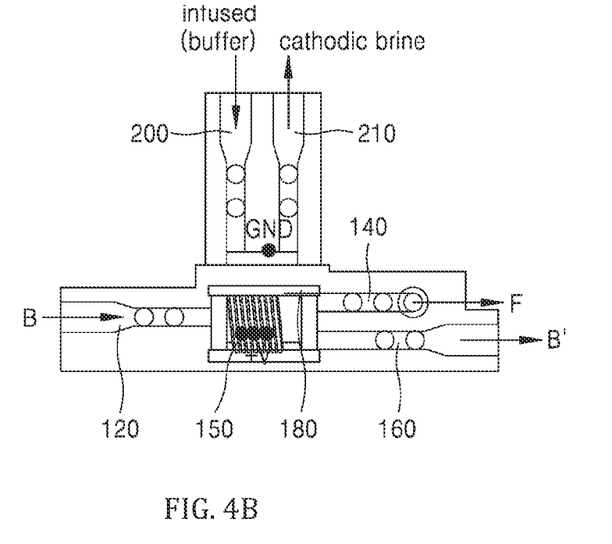
Figure 5:
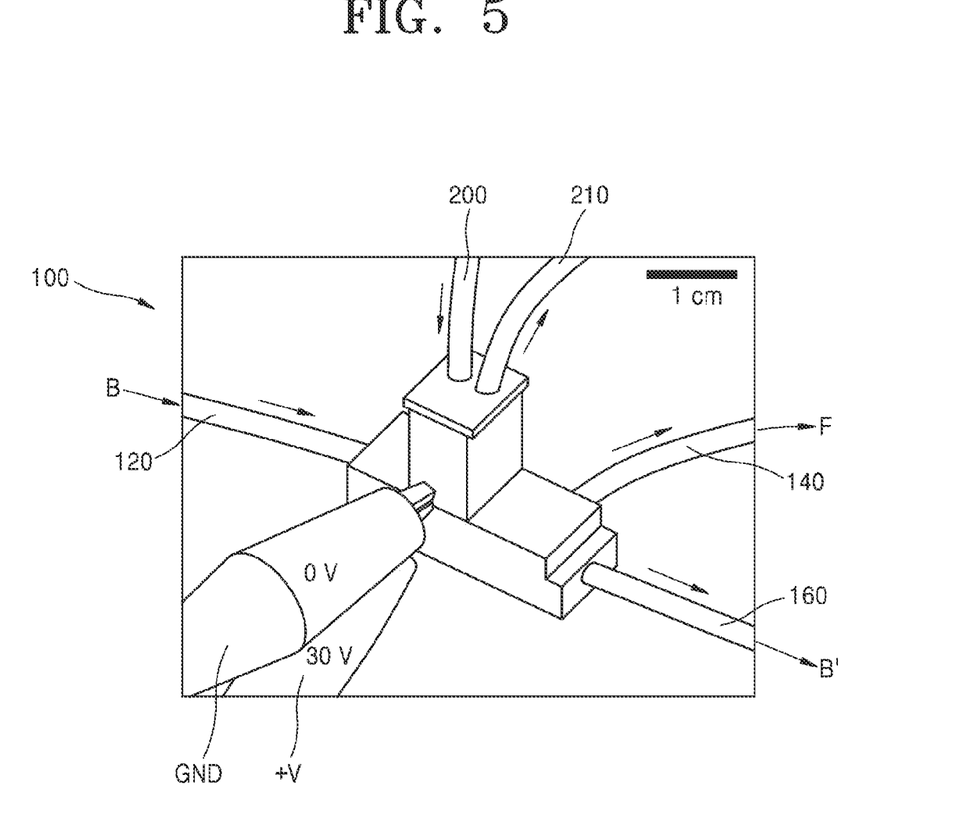

FIG. 2 is a schematic view illustrating a purification device 100 according to a first embodiment of the present invention. (a) of FIG. 2 shows a purification principle of a purification device 100, and (b) of FIG. 2 shows a shape of the purification device 100 implementing the purification principle. Photographs of actual implementation of the purification device 100 of (b) of FIG. 2 are shown in FIGS. 4 and 5.

Figure 3A:
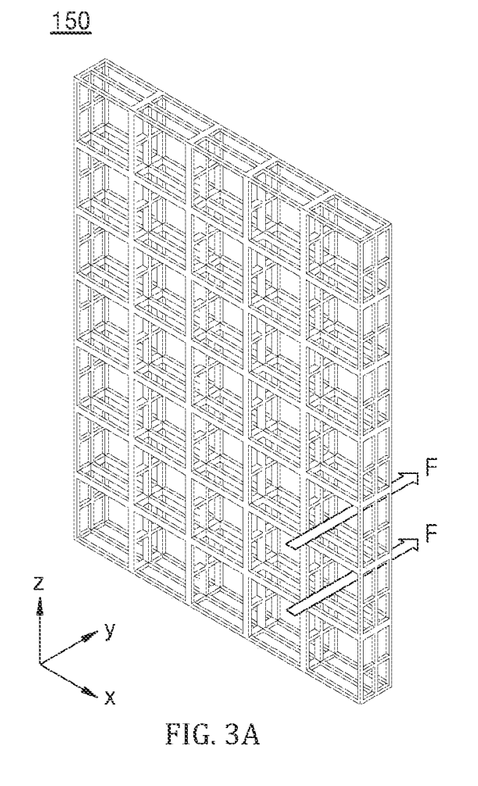
FIG. 3 is a perspective view illustrating a mesh part according to an embodiment of the present invention.
Figure 3B:
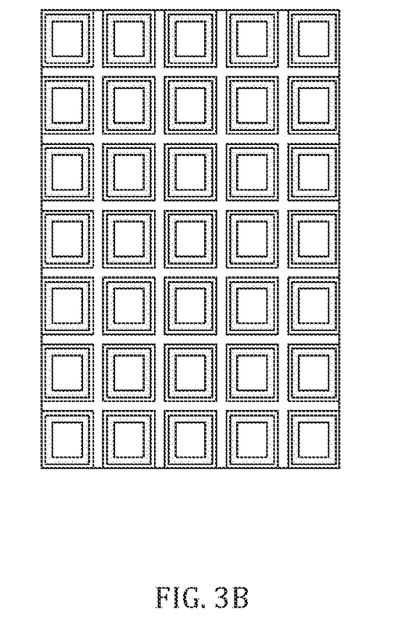
Figure 3C:
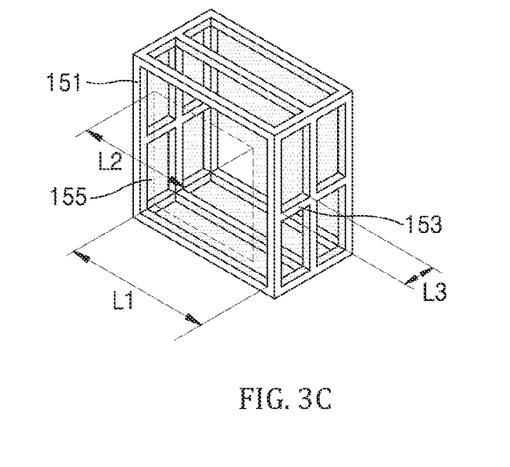

FIG. 3 is a perspective view illustrating a mesh part 150 according to an embodiment of the present invention. (a) of FIG. 3 shows a total skeleton 151 of a mesh part 150, (b) of FIG. 3 shows an actual photograph of the mesh part 150, and (c) OF FIG. 3 shows an enlarged view of a single lattice of the mesh part 150.

The present invention is characterized by providing a purification device 100 which has a high water treatment capacity corresponding to a large amount corresponding to at least several mL per minute with respect to a substance to be purified moving through a macro-channel.

The purification device 100 according to the first embodiment of the present invention, which is a purification device 100 that purifies a fluid using an ion concentration polarization phenomenon, may include: an injection channel 120 provided with, at one end thereof, an inlet for injecting a substance B to be purified; a purification channel 140 and a discharge channel 160 which branch from the other end of the injection channel 120 with a mesh part 150 interposed therebetween such that a purified substance F is discharged from the purification channel and a remaining substance B' (or concentrated substance) to be purified is discharged from the discharge channel; an ion-selective membrane 180 coming into contact with at least one side of the mesh part 150; and a buffer part 200 disposed on the other side of the ion-selective membrane 180 which is in contact with the mesh part 150. In addition, the mesh part 150 is characterized in that an ion-selective coating layer 155 is formed on a surface thereof and when an electric field is applied, an ion concentration polarization phenomenon (ICP) occurs in the other end of the injection channel 120 and a region adjacent to the mesh part 150, and thus, an ion depletion zone P is formed.

The channels of the purification device 100 may have a channel having a larger diameter than the channels of the micro-channel device of FIG. 1 so that a large amount of fluid may flow therethrough. For example, a channel with mm or cm scale larger than μm scale may be provided.

The substance B to be purified (for example, a brine) may be injected into the injection channel 120 through an inlet provided on one end (left side end in FIG. 2) of the injection channel. The injection channel is shown as a single channel, but in order to distribute a large amount of flow rate to a wide range, the injection channel 120 may also branch into a plurality of channels 121, 122, 123, 124, 125, ... (see (b) of FIG. 2). Favorably, each of the channels has a height of approximately 1 mm or less in order to minimize the influence of gravitational force.

One end of the purification channel 140 may be formed such that the mesh part 150 is interposed between the one end thereof and the other end of the injection channel 120. The purified substance F (that is, fresh water) may be discharged from the other end of the purification channel 140.

One end of the discharge channel 160 may be formed such that the mesh part 150 is interposed between the one end and the other end of the injection channel 120. The discharge channel 160 is a branch passage different from the purification channel 140, and the remainder B', except for the purified substance F discharged through the purification channel 140 in the substance B to be purified injected into the injection channel 120, may be discharged through the discharge channel. The purification channel 140 and the discharge channel 160 may be physically separated and divided by a separating part 170 such as a channel wall.

The ion-selective membrane 180 selectively allows only specific ions (for example, positive ions, $Na^+$, etc.) to pass therethrough, and may be disposed on one side of the channels of the purification device 100 in a direction parallel to the channels. The ion-selective membrane 180 may be made of material including Nafion which is a porous nano-material.

In the buffer part 200, for example, an electrolytic aqueous solution having a concentration corresponding to the material injected into the injection channel 120 may be injected, and a high-concentration solution of at least approximately 100 mM may be injected for low electrical resistance. Besides, in order to prevent an electrode reaction, an electrolytic aqueous solution having various components and concentration may be injected. The buffer part 200 may be formed to be in contact with the ion-selective membrane 180, and most of salts may be discharged through a buffer part outlet 210.

In order to increase the water treatment capacity under a high flow rate condition, an ion concentration polarization phenomenon should occur within a range corresponding to the total cross-sectional area of the injection channel 120. In addition, since an ion depletion zone P should be formed and stably maintained within a range corresponding to the total cross-sectional area of the injection channel 120, movements of sufficient amount of positive ions through the ion-selective membrane 180 should be guaranteed.

However, it is impossible to generate an ion depletion zone P corresponding to the total size of the channel cross-section only with the ion-selective membrane 180. Even when a high voltage is applied, there is a limit in expanding the size of the ion depletion zone P, and it is not easy to maintain the expanded ion depletion zone P for a long time. Accordingly, the purification device 100 according to the present invention may be allowed to have a water treatment capacity of at least several mL by introducing the mesh part 150 having an ion-selective coating layer 155 on the surface thereof.

A lattice structure introduced in the mesh part 150 serves two functions.

First, the lattice structure increases the surface area and maximizes positive ion conductivity. With only the ion-selective membrane 180 without the mesh part 150, it is impossible to allow a sufficient amount of positive ions in a substance to be purified of the injection channel 120, and to generate the ion depletion zone P. Similarly, even when employing a lattice structure, a sufficient amount of positive ions cannot move unless the ion-selective coating layer 155 is formed.

Secondly, the lattice structure is used as a medium for expanding the ion depletion zone P. An electrokinetic instability is formed in the ion depletion zone P, and the more the characteristic length of the electrokinetic instability generation portion increases up to at least several hundred micrometers, the larger the instability. Accordingly, the lattice structure is introduced to a skeleton 151 on which the ion-selective coating layer 155 is formed, and thus, the ion depletion zone P is expanded and the ion concentration polarization phenomenon may stably be maintained.

Since the ion-selective coating layer 155 is formed on the mesh part 150, only specific ions (for example, positive ions, $Na^+$, and the like) may pass through the mesh part as in the ion-selective membrane 180. The ion-selective coating layer 155 may be made of a Nafion material. Meanwhile, since the mesh part 150 has the lattices, purified substance F and fluid can pass through the mesh part unlike the ion-selective membrane 180. Accordingly, unlike the ion-selective membrane 180 disposed parallel to the movement direction of the fluid, the mesh part 150 does not affect the flow of the fluid, and may be disposed perpendicular to the movement direction of the fluid or while forming a predetermined angle.

Referring again to FIG. 2, since the mesh part 150 is disposed perpendicular to the movement direction of the fluid or while forming a predetermined angle, the ion depletion zone P may be formed and stably maintained within a range corresponding to the total cross-sectional area of the injection channel 120. In other words, the ion concentration polarization (ICP) is generated by sufficiently moving the positive ions along the ion-selective coating layer 155 of the mesh part 150 in the direction (v→GND direction) of applying an electric field, and the ion depletion zone P may be widely and stably formed on the entire surface of the mesh part 150 and on a portion adjacent to the injection channel 120. Positive ions move along the lattices of the mesh part 150, and may pass through the ion-selective membrane 180 adjacent to one side of the mesh part 150 and move to the buffer part 200.

Purification may be performed while particles assuming electrical charges are pushed out of the generated ion depletion zone P. When the mesh part 150 is tilted at a predetermined angle and the ion depletion zone P is obliquely generated, the pushed out particles may move to the discharge channel 160. The substance F purified through the installed separating part 170 and the remaining substance B' (particle concentrated substance) may be separated and collected. The purified substance F passed through the through-holes of the lattices, the fluid, and the like move to the purification channel 140, the fluid (remaining non-purified substance B' or particle concentrated substance) which could not passed through the through-holes if the lattices may move to the discharge channel 160.

The ion-selective membrane 180 may move the positive ions to the buffer part 200 and may prevent the interference in flow between the main channel (injection channel 120), the purification channel 140, the discharge channel 160, and the buffer channels 200 and 210.

Referring again to FIG. 3, the structure of the skeleton 151 of the mesh part 150 may have a shape in which a plurality of lattices are formed along a first direction (x-direction), a second direction (z-direction) perpendicular to the first direction, and a third direction (y-direction) perpendicular to or inclined with respect to a surface formed by the first direction and the second direction. In addition, the ion-selective coating layer 155 may be formed to have a predetermined thickness on the surface of the skeleton 151.

Favorably, the size L1 of the short side of the lattice in the first direction and the second direction is larger than the size L3 of the lattice in the third direction. That is, the lattice size L1 is required to be formed relatively large so that the substance F purified through the through-holes of the lattices, formed in the first and second directions, may pass through. When also considering the thickness of the ion-selective coating layer 155, the size of the through-hole of the lattice may actually be L2. The lattice size L1 in the first direction and the second direction may be approximately several ten μm to several hundred and the lattice size L3 in the third direction may be approximately several ten μm to several hundred μm within a range smaller than the range of the L1. In an embodiment, the lattice size L1 in the first direction and the second direction may be approximately 500-700 μm, and the lattice size L3 in the third direction may be approximately 200-400 μm. In addition, the size L2 of through-hole of the lattice on which the ion-selective coating layer 155 is formed in the first direction and the second direction may decrease by approximately 100-200 μm compared to the size of the lattice before coating. That is, the ion-selective coating layer 155 may have the thickness of approximately 100-200 μm and be formed on the surface of the skeleton 151. However, it is made clear that the embodiment is not limited to these numerical values.

Meanwhile, when considering that the purified substance F passes through in the third direction (y-direction), it is necessary to form the lattice sizes L1, L2, and L3 so as to remove the fluid interference between each of the lattices and to maximize the contact area between the fluid and the ion-selective coating layer 155. In addition, in order to allow the purified material F to pass through the through-holes of the lattices formed in the first direction and the second direction, not to allow the purified material F to pass through the side surfaces of the through-holes, and to allow the ion depletion zone P to be stably formed, the lattices formed in the third direction may be clogged by the ion-selective coating layer 155. In other words, the thickness of the ion-selective coating layer 155 formed on the surface of the skeleton may be formed to be equal to or larger than the lattice size in the third direction. In order to decrease the lattice size, the skeleton 153 may be added between the through-holes of the lattices formed in the third direction. Since the lattices formed in the third direction is clogged by the ion-selective coating layer 155, the generation of flow interference between the lattices is suppressed and the ion depletion zone P may be formed.

In order to process the more amount of fluid inside the channel, a plurality of mesh parts 150 may also be disposed. At this point, the plurality of mesh parts 150 are favorably disposed so as to face a main surface (x-z direction surface).

FIGS. 4 and 5 are photographs of a purification device 100 according to an embodiment of the present invention. Channels 121, 122, . . . were formed so that an injection channel 120 branches into a plurality of channels, and a groove part capable of accommodating a mesh part 150 was formed. The mesh part 150 was disposed so as to be perpendicular to the direction of injecting a substance to be purified in the injection channel 120 or to form a predetermined angle with the direction, and an ion-selective membrane 180 was disposed on an upper side surface of the mesh part 150. A buffer part 200 and a buffer part outlet 210 were connected to the upper side of the ion-selective membrane 180. On the other side of the mesh part 150, a purification channel 140 and a discharge channel 160 were formed to branch into respective individual channels. An application electrode was connected to the mesh part 150 to apply a voltage (apply 30V in the embodiment of FIG. 5), and a ground electrode was connected to the buffer part 200. Since the ground electrode is connected to the buffer part 200, an electrode reaction may be disconnected from main channels (injection channel 120, purification channel 140, and discharge channel 160). An electrode reaction product may be generated from the application electrode V installed on the discharge channel branch of the main channel, and the purification channel 140 branch may collect the purified substance F without being influenced by the electrode reaction.

Figures 6, 6A:
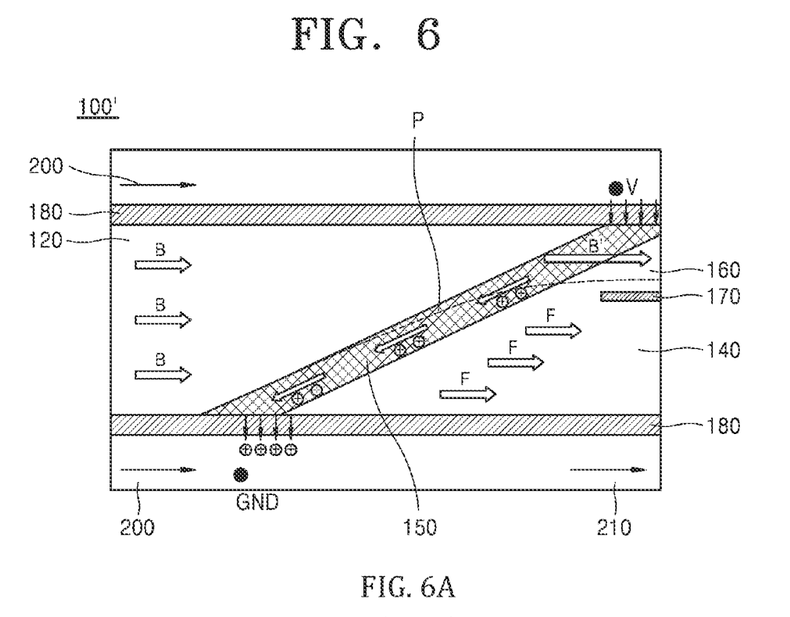
FIG. 6 is a schematic view illustrating a purification device according to a second embodiment of the present invention.
Figure 6B:
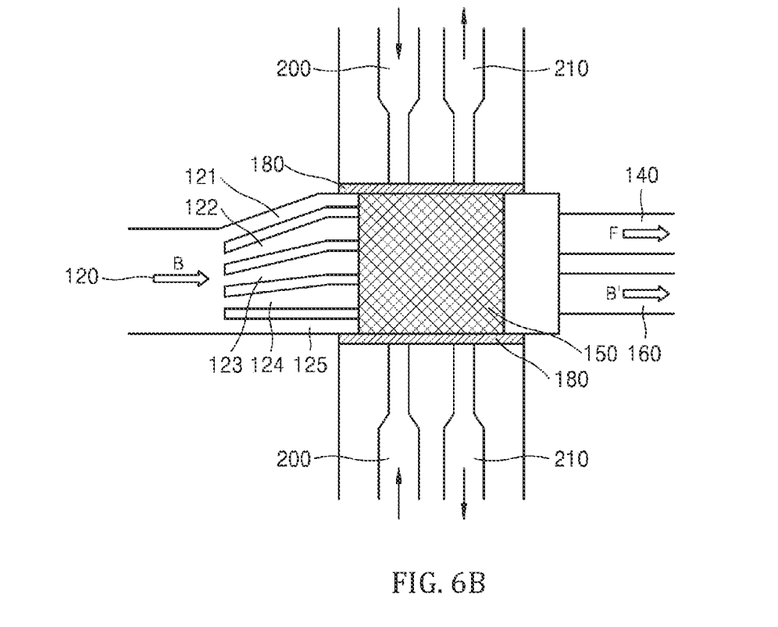

FIG. 6 is a schematic view illustrating a purification device 100' according to a second embodiment of the present invention.

A purification device 100' according to the second embodiment of the present invention, which is a purification device 100 that purifies a large amount of fluid using an ion concentration polarization phenomenon, may include: an injection channel 120 provided with, at one end thereof, an inlet for injecting a substance B to be purified; a purification channel 140 and a discharge channel 160 which branch from the other end of the injection channel 120 with a mesh part 150 interposed therebetween such that a purified substance F is discharged from the purification channel and a remaining substances B' to be purified is discharged from the discharge channel; an ion-selective membrane 180 coming into contact with both sides of the mesh part 150; and a buffer part 200 disposed on the other side of the ion-selective membrane 180 which is in contact with the mesh part 150. In addition, the mesh part 150 is characterized in that an ion-selective coating layer 155 is formed on a surface thereof and when an electric field is applied, an ion concentration polarization (ICP) phenomenon occurs in the other end of the injection channel 120 and a region adjacent to the mesh part 150, and thus, an ion depletion zone P is formed.

The purification device 100' according to the second embodiment has a shape including two buffer channels (buffer part 200 and buffer part outlet 210) and two ion-selective membranes 180 disposed so as to be in contact with the buffer channels, and the remaining configuration is the same as the first embodiment.

Since electrodes V and GND are connected to an upper buffer channel and a lower buffer channel, all electrode reactions may be disconnected from main channels (injection channel 120, purification channel 140, and discharge channel 160). The purification device 100' according to the second embodiment has a merit in that pressure unbalance and contamination due to by-products of electrode reactions at the main channels may be prevented. However, a driving voltage may be increased due to the resistance of the buffer channel.

Figures 7, 7A:
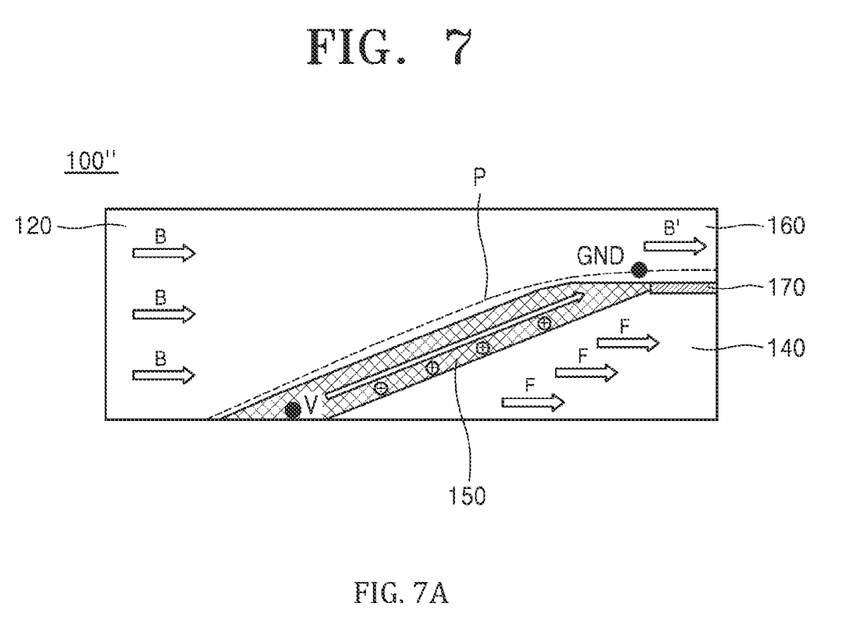
FIG. 7 is a schematic view illustrating a purification device according to a third embodiment of the present invention.
Figure 7B:
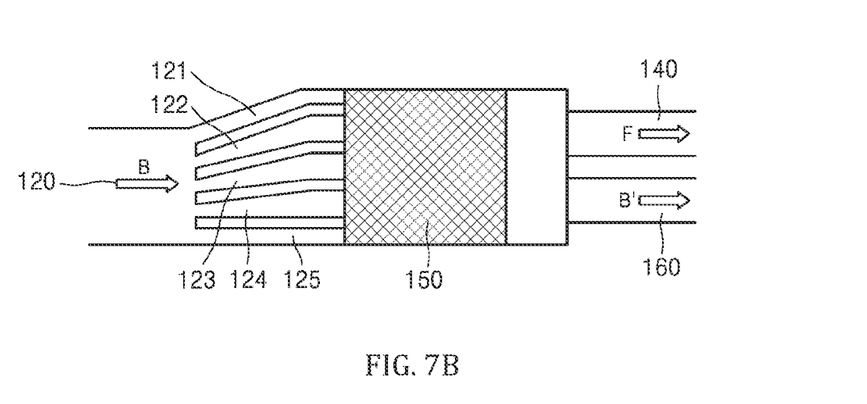

FIG. 7 is a schematic view illustrating a purification device 100' according to a third embodiment of the present invention.

The purification device 100" according to the third embodiment of the present invention, which is a purification device 100" that purifies a large amount of fluid using an ion concentration polarization phenomenon, may include: an injection channel 120 provided with, at one end thereof, an inlet for injecting a substance B to be purified; and a purification channel 140 and a discharge channel 160 which branch from the other end of the injection channel 120 with a mesh part 150 interposed therebetween such that a purified substance F is discharged from the purification channel and a remaining substance B' to be purified is discharged from the discharge channel. In addition, the mesh part 150 is characterized in that an ion-selective coating layer 155 is formed on a surface thereof and when an electric field is applied, an ion concentration polarization (ICP) phenomenon occurs in the other end of the injection channel 120 and a region adjacent to the mesh part 150, and thus, an ion depletion zone P is formed.

The purification device 100" according to the third embodiment has a shape including two buffer channels (buffer part 200 and buffer part outlet 210) and two ion-selective membranes 180 disposed so as to be in contact with the buffer channels, and the remaining configuration is the same as the first embodiment.

In the shape, all electrodes V and GND are installed and operate inside main channels (injection channel 120, purification channel 140, and discharge channel 160) without a buffer channel, an application electrode V is installed to the wall of the purification channel 140, and a ground electrode GND is installed in the vicinity of the discharge channel 160. Since there is no buffer channel, the direction of electric field can be set opposite to those in the first and second embodiments so that ion concentration polarization occurs at both ends of the mesh part 150.

The purification device 100" of the third embodiment has a simple device structure, is easily manufactured and integrated, is efficient when an electrode reaction is very small or is absent, and is desirable for purifying a substance to be purified having a low concentration of approximately several ten mM.

Figure 8A:
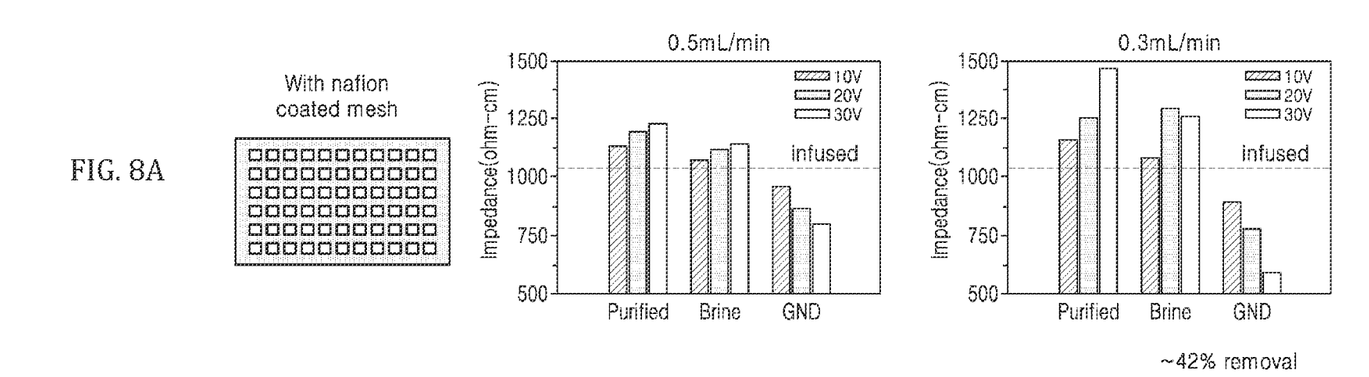
FIG. 8 is a graph comparing a case of forming an ion selective coating layer on a mesh part according to an experimental example of the present invention and a case of not forming the ion selective coating layer.
Figure 8B:
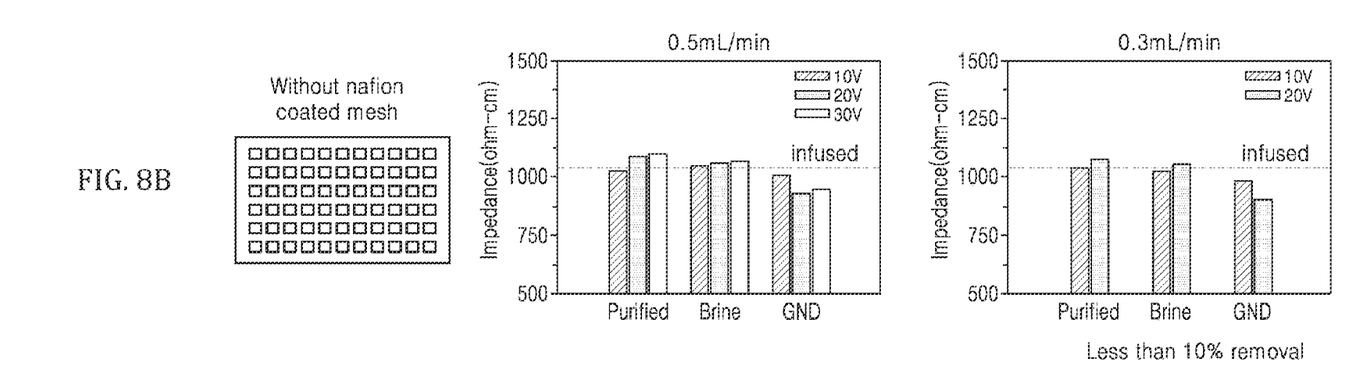

FIG. 8 is a graph comparing a case ((a) of FIG. 8) of forming an ion selective coating layer on a mesh part according to an experimental example of the present invention and a case ((b) of FIG. 8) of not forming an ion selective coating layer. The dotted line in the middle of each graph indicates an impedance value of the injected substance to be purified, and the value may be used as a reference point.

Referring to (a) of FIG. 8, when an ion-selective coating layer 155 is formed on a mesh part 150, a large difference between the impedance values of a purified substance F (Purified) and a brine B' (Brine) is shown. In particular, the impedance of the purified substance F is shown to be remarkably larger than the numerical impedance value (dotted line), and it may be considered that the impedance increases because ions are removed from the purified substance F. Since a ground electrode is connected to a buffer part 200 from which positive ions escape, the impedance is shown to be low.

When comparing the graphs of an injection flow rate of 0.5 mL/min and an injection flow rate of 0.3 mL/min, the impedance of the purified substance F is shown to be high when the flow rate is small, and thus, it can be confirmed that purification efficiency (42%) is higher.

On the contrary, referring to (b) of FIG. 8, when the ion-selective coating layer 155 is not formed on the mesh part 150, almost no difference is shown between the impedance values of the purified substance F and a brine B'. Since water treatment is performed at the mesh part 150 with the ion-selective membrane 150 without generating an ion depletion zone P, it may be confirmed that very small purification efficiency (at most 10%) is shown.

Figures 9A, 9B, 9C:
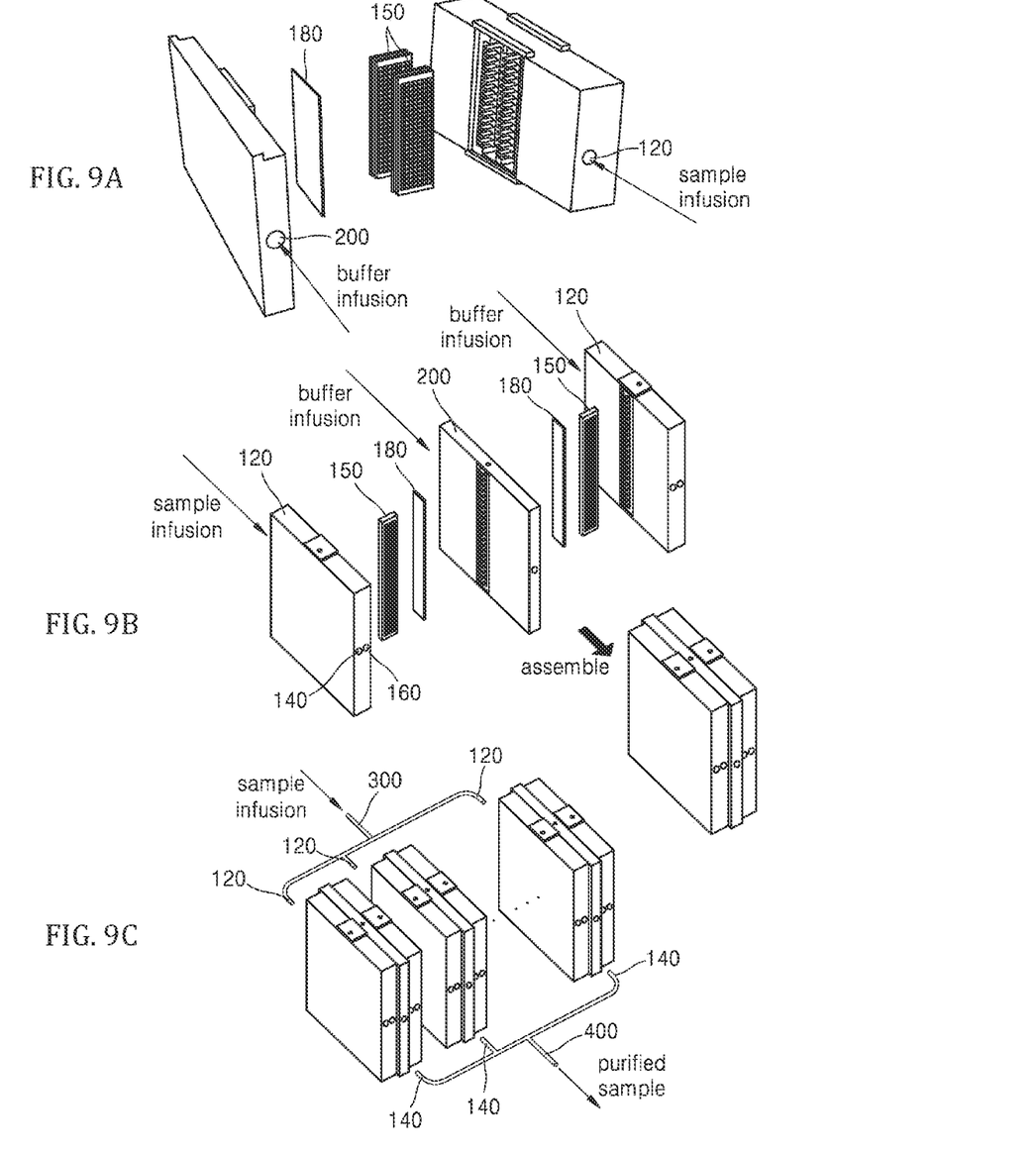
FIG. 9 is a schematic view illustrating an arrangement configuration of a mesh part of a purification device and arrangement configuration of purification devices in a purification system according to several embodiments of the present invention.

FIG. 9 is a schematic view illustrating an arrangement configuration of a mesh part 150 of a purification device 100 and an arrangement configuration of purification devices in a purification system according to several embodiments of the present invention.

Referring to (a) of FIG. 9, a plurality of mesh parts 150 may be disposed in series inside a main channel of a purification device 100. The plurality of mesh parts 150 are favorably disposed so as to face a main surface (x-z direction surface) with each other. Since the substance to be purified passing through the main channel is multiply purified, purification efficiency may be improved. In addition, more amount of fluid may also be processed.

Referring to (b) of FIG. 9 and (c) of FIG. 9, a single-device purification system having a high water treatment capacity may be implemented by integrating a plurality of purification devices 100.

(b) of FIG. 9 shows a purification system in which adjacent purification devices 100 share a single buffer part 200 therebetween. Since two channels share a single buffer channel, the degree of integration may be enhanced while reducing the device size.

(c) of FIG. 9 shows a purification system in which: a plurality of purification devices 100 are disposed in parallel; injection channels 120 of the respect purification devices 100 are integrated and receive an injected substance B to be purified; purification channels 140 are integrated into a single channel 400, and the purified substance F is discharged. Through such a manufacturing process, several number of single purification devices 100 are connected if necessary, and thus, water treatment capacity thereof may be changed.

Meanwhile, in an embodiment of the present invention, the purification device 100 and the purification system may be used as a portable peritoneal dialysis device. In case of hemodialysis and peritoneal dialysis, which are existing dialysis methods, periodic visits to hospital are required, infectious diseases such as peritonitis may be caused, and risk is involved due to blood loss and use of anticoagulant drugs. However, the present invention has a merit of being used as a portable peritoneal dialysis device because of being manufactured with a reduced size and capable of expanding water treatment capacity. Accordingly, the quality of life may be remarkably improved without restricting the life radius of a kidney disease patient.

The present invention has been illustrated and described with respect to preferred embodiments as described above, various modifications and changes are possible by a person skilled in the art to which the present invention belongs without departing from the spirit of the present invention, which is not limited to the above embodiments. Such modifications and changes should be construed to fall within the scope of the invention and the appended claims.

What is claimed is:

1. A purification device, which is configured to purify a fluid using an ion concentration polarization phenomenon, the purification device comprising:

an injection channel provided with, at one end thereof, an inlet for injecting a substance to be purified thereinto;

a purification channel which branch from the other end of the injection channel with a mesh part interposed therebetween such that a purified substance is discharged from the purification channel;

a discharge channel which branches from the other end of the injection channel with the mesh part interposed between the injection channel and the discharge channel such that a remaining substance to be purified is discharged from the discharge channel;

an ion-selective membrane in contact with at least one side of the mesh part; and a buffer part disposed on the other side of the ion-selective membrane in contact with the mesh part, wherein the mesh part has an ion-selective coating layer formed on a surface thereof, an application electrode is connected to the mesh part to apply a voltage, and a ground electrode is connected to the buffer part.

2. The purification device of claim 1, wherein the mesh part has a shape having a plurality of lattices formed to be perpendicular to a first direction, a second direction perpendicular to the first direction, and a surface formed by the first direction and the second direction.

3. The purification device of claim 2, wherein the purified substance of the mesh part passes through through-holes of lattices formed in the first direction and the second direction and flows to the purification channel, and the substance to be purified not having passed the through-holes of the lattices flows to the discharge channel.

4. The purification device of claim 2, wherein a lattice size in the third direction is smaller than lattice sizes in the first direction and the second direction.

5. The purification device of claim 4, wherein a thickness of the ion-selective coating layer formed on a surface of the mesh part is equal to or larger than the lattice size in the third direction.

6. The purification device of claim 4, wherein ions of the substance to be purified move along the ion-selective coating layer of the mesh part, whereby an ion concentration polarization phenomenon occurs.

7. The purification device of claim 1, wherein the plurality of mesh parts is disposed so as to face each other.

8. The purification device of claim 1, wherein the ion-selective membrane and the ion-selective coating layer are made of a Nafion material.

* * * * *